A. M. CUMMINGS.
LOCKING DEVICE FOR AUTOMOBILE WHEELS.
APPLICATION FILED MAR. 28, 1922.
Reissued Aug. 8, 1922. 15,428.
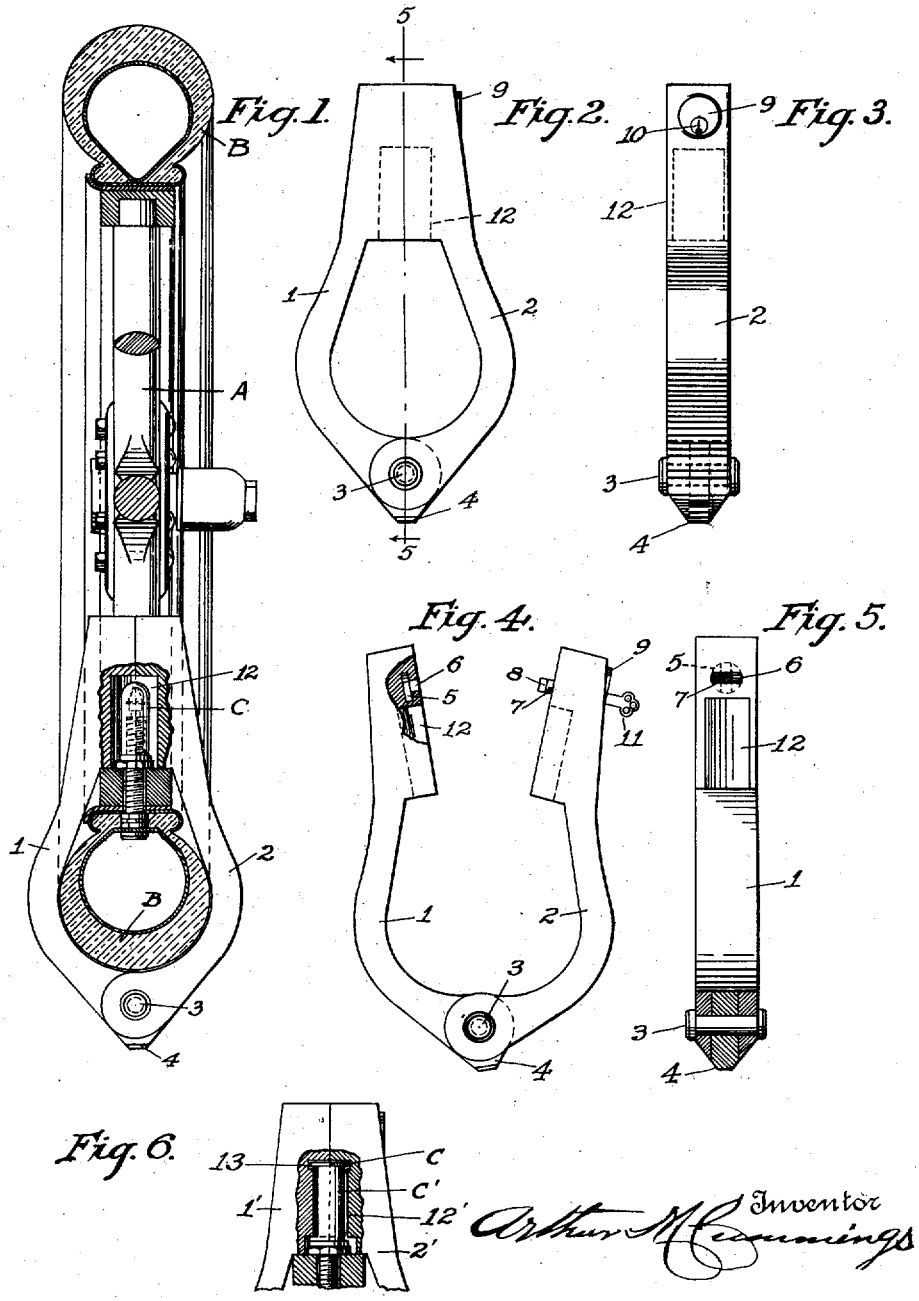

UNITED STATES PATENT OFFICE.

ARTHUR M. CUMMINGS, OF ABERDEEN, MARYLAND.

LOCKING DEVICE FOR AUTOMOBILE WHEELS.

15,428. Specification of Reissued Letters Patent. Reissued Aug. 8, 1922.

Original No. 1,390,674, dated September 13, 1921, Serial No. 319,492, filed August 23, 1919. Application for reissue filed March 28, 1922. Serial No. 547,545.

*To all whom it may concern:*

Be it known that I, ARTHUR M. CUMMINGS, a citizen of the United States, residing at Aberdeen, in the county of Harford and State of Maryland, have invented certain new and useful Improvements in Locking Devices for Automobile Wheels, of which the following is a specification.

This invention relates to locking devices for automobile wheels, and more particularly to devices of this character which are in the nature of a block designed to embrace the rim and tire, and adapted to engage the ground and prevent smooth rotation of the wheel.

Devices of this nature as heretofore proposed have been provided with a beak or enlargement, which, when in use, overlies the tread of the tire, and prevents it from rolling along the ground. It has been found, however, that where these devices were used on wheels equipped with pneumatic tires, a thief or miscreant would sometimes deflate the tire, thus loosening the locking device, and would then turn it partly around so as to bring the enlargement to one side of the tread. By again inflating the tire, it was then possible for the wheel to rotate sufficiently to enable the thief to run the automobile, and get away with it.

It is the object of the present invention to so construct such a locking device as to prevent the tire being deflated as described, and as to render the same absolutely theft-proof. To this end I provide the locking device with a socket adapted to receive and inclose the inflation valve tube, and to completely inclose the valve end of the inflation valve tube, and positively prevent access thereto.

In order that the invention may be readily understood, reference is had to the accompanying drawing, forming part of this specification, and in which:—

Figure 1 is a vertical transverse section through an automobile wheel and pneumatic tire, showing my improved locking device applied thereto, parts being in elevation;

Fig. 2 is a front elevation of my improved locking device detached;

Fig. 3 is a side or edge elevation thereof;

Fig. 4 is a view similar to Fig. 2, but showing the device in its open or unlocked position;

Fig. 5 is a longitudinal section on the line 5—5 of Fig. 2, looking in the direction of the arrow; and Fig. 6 is a fragmentary view similar to Fig. 1, showing a slightly modified construction.

Referring to the drawings in detail, A designates a wheel and B the pneumatic tire, while C designates the usual valve tube dust cap.

My improved locking device consists of the two members 1 and 2 pivoted together at 3 and one of these members may be provided adjacent the pivot with a beak, spur, or enlargement 4 which is adapted to engage the ground when the locking device is in position, and thus prevent rotation of the wheel.

The members 1 and 2 are adapted to embrace the tire and rim, as shown in Fig. 1, and are brought together at their upper ends into locking engagement. The inner face of the member 1 is provided with a locking socket, 5, 6, and the other member carries a bolt 7 having a T-shaped head 8 adapted to enter the locking socket. It will be understood that the locking socket consists of an elongated slot 6 communicating with an undercut circular chamber 5. The head 8 of the locking bolt 7 is adapted to enter the slot 6 and then be rotated so as to engage under the adjacent walls of the chamber 5 and thus hold the members 1, 2 together.

The bolt 7 is arranged to be rotated by means of a cylinder lock 9 of any suitable construction, provided with a keyhole 10, into which fits a key 11.

The upper portion of the locking device has formed therein a socket 12 adapted to receive and completely inclose the valve tube dust cap C, as shown in Fig. 1. This socket is formed by two semi-cylindrical recesses in the meeting faces of the members 1, 2.

It will be apparent, therefore, that when the locking device is in position, as shown in Fig. 1, it will be impossible to turn or shift the same. Moreover, the inflation valve tube is entirely concealed and protected so that it can not be tampered with. By this means, all possibility of deflation of the tire for the purpose of shifting the locking device is eliminated.

In some cases it may be advisable to form the dust cap C′ with a head or flange *c*, as shown in Fig. 6. In this case the chamber or socket 12′ formed in the members 1′ and 2′ will be provided with an annular groove 13 adapted to receive the head or flange *c*. By this construction, radial displacement of the locking device is prevented, even though the tire should be deflated.

What I claim is:

1. An anti-theft device for use with automobiles provided with pneumatic tires, comprising means adapted to be locked to a tire for preventing flation of the tire through its valve and for preventing displacement of the device from a fixed position, said means comprising a pair of pivotally connected members adapted to embrace the tire and a socket for completely receiving and inclosing the valve end of the inflation valve tube.

2. An anti-theft device for automobiles provided with wheels having pneumatic tires, comprising means adapted to be locked to a wheel rim and tire for causing the automobile to bump when moved, for preventing flation of the tire through its valve and for preventing displacement of the device from a fixed position, said means comprising a pair of pivotally connected members adapted to embrace the wheel rim and tire and a socket for completely receiving and inclosing the valve end of the inflation valve tube.

3. An anti-theft device for use with automobiles provided with pneumatic tires, comprising means adapted to be locked to a tire for preventing flation of the tire through its valve and for preventing displacement of the device from a fixed position, said means comprising a pair of pivotally connected members adapted to embrace the tire and each member having a recess, said recesses coacting to form a socket for completely receiving and inclosing the valve end of the inflation valve tube.

4. An anti-theft device for automobiles provided with wheels having pneumatic tires, comprising means adapted to be locked to a wheel rim and tire for causing the automobile to bump when moved, for preventing flation of the tire through its valve and for preventing displacement of the device from a fixed position, said means comprising a pair of pivotally connected members adapted to embrace the wheel rim and tire and each member having a recess, said recesses coacting to form a socket for completely receiving and inclosing the valve end of the inflation valve tube.

5. The combination with a pneumatic tire and inflation valve tube, of a dust cap fitting over said tube and having a flange, and means adapted to be locked to said tire for preventing flation of the tire through its valve and for preventing displacement of the device from a fixed position, said means comprising a pair of pivotally connected members adapted to embrace the tire and a socket adapted to inclose said dust cap, said socket being provided with an internal groove adapted to receive the flange of the dust cap.

6. The combination with a wheel having a pneumatic tire and inflation valve tube, of a dust cap fitting over said tube and having a flange, and means adapted to be locked to the wheel rim and tire for causing the automobile to bump when moved, for preventing flation of the tire through its valve and for preventing displacement of the device from a fixed position, said means comprising a pair of pivotally connected members adapted to embrace the wheel rim and tire and a socket adapted to inclose said dust cap, said socket being provided with an internal groove adapted to receive the flange of the dust cap.

7. A locking device for wheels having pneumatic tires, comprising a pair of pivotally connected members adapted to embrace the wheel rim and tire, said device being provided with a road engaging element and having a socket adapted to completely inclose the inflation valve tube.

8. A locking device for wheels having pneumatic tires comprising a pair of pivotally connected members adapted to embrace the wheel rim and tire, said device having a road engaging element and each member having a recess, said recesses together forming a socket adapted to completely inclose the inflation valve tube.

9. The combination with a wheel having a pneumatic tire and inflation valve tube, of a dust cap fitting over said tube and having a flanged head, and a locking device comprising a pair of pivotally connected members shaped to embrace the rim and tire, said device carrying a road engaging element and having a socket adapted to inclose said dust cap, said socket being provided with an internal annular groove adapted to receive the flanged head of the dust cap.

ARTHUR M. CUMMINGS.